United States Patent
Bosco

(10) Patent No.: US 12,165,037 B2
(45) Date of Patent: Dec. 10, 2024

(54) DATA PROCESSING METHOD, CORRESPONDING PROCESSING SYSTEM, SENSOR DEVICE AND COMPUTER PROGRAM PRODUCT

(71) Applicant: STMicroelectronics S.r.l., Agrate Brianza (IT)

(72) Inventor: Angelo Bosco, Giarre (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 768 days.

(21) Appl. No.: 17/391,363

(22) Filed: Aug. 2, 2021

(65) Prior Publication Data

US 2022/0051081 A1    Feb. 17, 2022

(30) Foreign Application Priority Data

Aug. 14, 2020  (IT) ........................ 102020000020161

(51) Int. Cl.
*G06N 3/047*  (2023.01)
*G06F 18/214*  (2023.01)

(52) U.S. Cl.
CPC .......... *G06N 3/047* (2023.01); *G06F 18/2148* (2023.01)

(58) Field of Classification Search
CPC ..................................................... G06N 3/047
USPC ......................................................... 706/15
See application file for complete search history.

(56) References Cited

U.S. PATENT DOCUMENTS

| | | | |
|---|---|---|---|
| 10,963,188 B1* | 3/2021 | Erden | G06V 10/82 |
| 2015/0221313 A1* | 8/2015 | Purnhagen | G10L 19/0208 704/500 |
| 2016/0210556 A1 | 7/2016 | Ben Simhon et al. | |
| 2018/0248903 A1 | 8/2018 | Villella et al. | |
| 2018/0284741 A1 | 10/2018 | Cella et al. | |
| 2019/0204124 A1* | 7/2019 | Moriyama | G01D 18/00 |
| 2021/0067381 A1 | 3/2021 | Bosco | |

* cited by examiner

*Primary Examiner* — Austin Hicks
(74) *Attorney, Agent, or Firm* — Slater Matsil, LLP

(57) ABSTRACT

An embodiment method comprises applying domain transformation processing to a time-series of signal samples, received from a sensor coupled to a dynamical system, to produce a dataset of transformed signal samples therefrom, buffering the transformed signal samples, obtaining a data buffer having transformed signal samples as entries, computing statistical parameters of the data buffer, producing a drift signal indicative of the evolution of the dynamical system as a function of the computed statistical parameters, selecting transformed signal samples buffered in the data buffer as a function of the drift signal, applying normalization processing to the buffered transformed signal samples, applying auto-encoder artificial neural network processing to a dataset of resealed signal samples, and producing a dataset of reconstructed signal samples and calculating an error of reconstruction. The error of reconstruction reaching or failing to reach a threshold value is indicative of the evolution of dynamical system over time.

21 Claims, 9 Drawing Sheets

DATA PROCESSING METHOD, CORRESPONDING PROCESSING SYSTEM, SENSOR DEVICE AND COMPUTER PROGRAM PRODUCT

CROSS-REFERENCE TO RELATED APPLICATIONS

This application claims the benefit of Italian Patent Application No. 102020000020161, filed on Aug. 14, 2020, which application is hereby incorporated herein by reference.

TECHNICAL FIELD

The description relates to computer-implemented processing of data sensed in a physical dynamical system. One or more embodiments may be applied to processing time-series data sensed via inertial sensors such as accelerometers, for instance for human activity recognition, gesture recognition or predictive maintenance of apparatuses such as electric motors.

BACKGROUND

Monitoring evolution over time of a physical dynamical system state (briefly, dynamical state) may involve collecting time series of data related to physical, measurable, parameters of the system via one or more heterogeneous sensors (e.g., inertial sensors such as accelerometers, gyroscopes, pressure sensors, and so on), configured for recording information in a certain domain.

Obtaining information about the underlying state of such a dynamical system may involve recasting the time series of data collected in a format suitable for further analysis, for instance applying some pre-processing such as Fast Fourier Transform (FFT) processing.

By way of example, vibrations produced by a motorized system may be used to characterize such a dynamical system.

Such further analysis may facilitate detecting instabilities or deviations from a desired, stable, operating state of the dynamical system, so that warning systems can be promptly triggered, in order to prevent system faults, for instance.

Conventional solutions for performing such an analysis may involve verifying whether the signals collected (or indicators obtained as a function of these signals) reach or fail to reach one or more thresholds, triggering alarm systems as a result.

Artificial neural network (ANN) processing, such as auto-encoder ANN processing stages, may be used to perform such further processing. This may be at the cost of training the ANN stages with a memory-heavy training dataset representative of a large number of the possible, stable, operating conditions.

Collecting and storing "offline" an adequate dataset of operating conditions can be time-consuming and burdensome; for instance, in an anomaly detection application scenario, a lengthy, guided dataset-acquisition procedure may be used to collect data from sensors during system stable operation, as a preparatory step to training the ANN.

Such an ANN training may use circuitry dedicated to the heavy training dataset and comprising a sizable amount of computational power available to perform complex computations involved.

Methods for processing signals from sensors of physical quantities using a reduced amount of computational resources and provide improved results are thus desirable.

SUMMARY

An object of one or more embodiments is to contribute in providing such an improved solution.

According to one or more embodiments, that object can be achieved by means of a method having the features set forth in the claims that follow.

A data processing method to detect anomalies in a dynamical system with periodic or quasi-periodic behavior such as motors, whose state can be measured by a signature vector or matrix, may be exemplary of such a method.

One or more embodiments may relate to a corresponding processing system and device.

A sensor device including one or more sensors, e.g. accelerometers, equipped with processing circuit to perform a method as per the present disclosure may be exemplary of such a device.

One or more embodiments may relate to the method as a computer-implemented method.

To that effect, one or more embodiments may comprise a computer program product loadable in the memory of at least one processing circuit (e.g., a computer) and comprising software code portions for executing the steps of the method when the product is run on at least one processing circuit. As used herein, reference to such a computer program product is understood as being equivalent to reference to computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may be suitable for loading in the memory of at least one processing circuit (e.g., a micro-controller) and comprise software code portions for executing the steps of the method when the product is run on at least one processing circuit. As used herein, reference to such an artificial neural network is understood as being equivalent to reference to an electronic circuit and/or computer-readable medium containing instructions for controlling the processing system in order to co-ordinate implementation of the method according to one or more embodiments.

The claims are an integral part of the technical teaching provided herein with reference to the embodiments.

One or more embodiments may rely on the recognition that tailored sensor data processing may facilitate correcting the behavior of a dynamical system, for instance via a remote controller, as a reaction to a detected anomaly in the system.

One or more embodiments may involve a pipeline configured for processing time-series collected via one or more sensors, for instance via a tri-axial accelerometer sensor.

In one or more embodiments, processing the time-series collected may include applying a transform to a new coordinate system where the data collected may be easier to process and interpret, for instance in order to detect system malfunctioning and triggering an alert notification.

One or more embodiments may facilitate analyzing a signature specific of a representative set or cluster of states of a dynamical system which may be of interest for monitoring purposes.

In one or more embodiments, normal operating conditions of a dynamical system can be learnt online, in an automatic manner, in contrast to using manually defined thresholds and/or condition indicators.

One or more embodiments may facilitate limiting the amount of data involved in learning signal behavior in normal operating conditions.

One or more embodiments may facilitate detecting whether a dynamical system is in a known, stable state condition or is deviating from its expected behavior.

One or more embodiments may be suitable to process any "signature" signal or data that is stationary as long as the underlying dynamical system is stationary.

One or more embodiments may advantageously use an indirect, lower dimensional observation of the state of a dynamical system using sensors, with each sensor recording information in a particular physical domain (e.g. vibration, sound, temperature, visual aspect, etc.).

One or more embodiments may use a tailored detector stage to detect stable conditions and incorporate them in a corresponding model by operating online.

In one or more embodiments, training an artificial neural network circuit (briefly, a neural network or NN) may involve drawing samples from known random distributions. This may facilitate reducing memory storage use and exploiting relatively simple processing circuitry with reduced computational power.

One or more embodiments may be used in a transparent manner in different application scenarios where time series of data of a dynamical system are sensed.

In various contexts, characterizing a dynamical system state (e.g., periodic or quasi-periodic) via one or more sensors may be advantageous. For instance, it may be desirable to extract clear indications of the state of a dynamical system from such a sensor, in order to know whether the dynamical system is operating in a stable or perturbed state.

One or more embodiments envisage applying a series of transformations to project sensor data into a coordinate space where classification and anomaly detection may be easier and more (computationally) straightforward.

One or more embodiments may facilitate, for instance, classifying human activity from time-series recorded by a "wearable" sensor. This may facilitate monitoring whether an individual is in a quiet condition, or walking, running, stepping stairs up and down, biking, driving, and so on.

One or more embodiments may facilitate gesture recognition, for instance in characterizing specific user gestures (for instance, up, down, gym gestures, etc.).

One or more embodiments may be applied to motor apparatuses, for instance in order to facilitate recording normal operation of a motor as well as detecting anomalies.

BRIEF DESCRIPTION OF THE DRAWINGS

One or more embodiments will now be described, by way of non-limiting example only, with reference to the annexed Figures, wherein.

DETAILED DESCRIPTION OF ILLUSTRATIVE EMBODIMENTS

Figure 1:
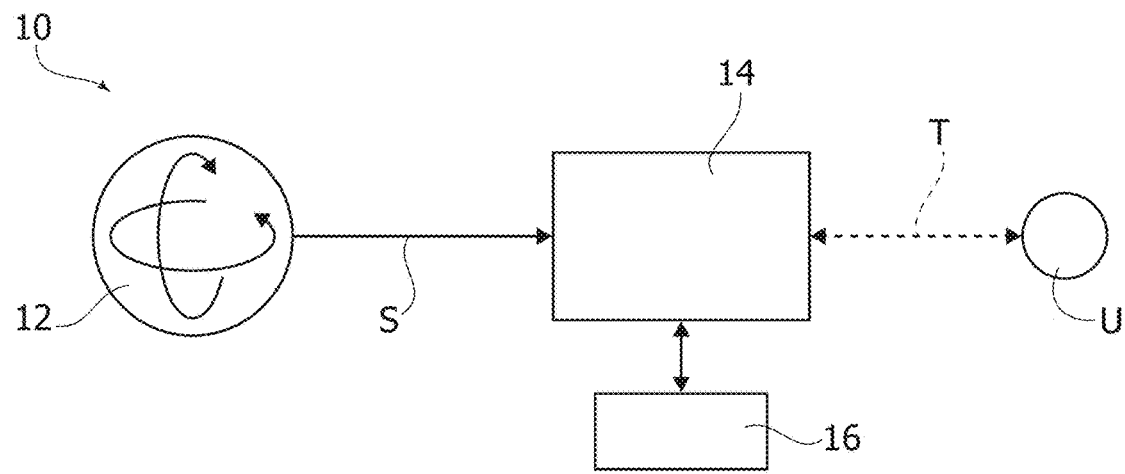
FIG. 1 is an exemplary diagram of a device as per the present disclosure.

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references/headings used herein are provided merely for convenience and hence do not define the extent of protection or the scope of the embodiments.

The drawings are in simplified form and are not to precise scale.

Throughout the figures annexed herein, like parts or elements are indicated with like references/numerals and a corresponding description will not be repeated for brevity.

For the sake of simplicity, one or more embodiments are discussed in the following by referring primarily to signals sensed from a mechanical system, such as a motor system, for instance, using an accelerometer sensor configured to sense vibrations traveling through the mechanical system.

It is noted that such an application is purely exemplary and not limiting, being otherwise understood that one or more embodiments as exemplified herein may be used to perform analysis of signals sensed from notionally any dynamical system, in particular systems that exhibit a periodic or quasi-periodic behavior.

Also, some basic concepts repeatedly referred to in the following are briefly discussed by way of general introduction to the instant detailed description.

Throughout this description, the designation neural network (NN) will be is used for brevity to indicate artificial neural network (ANN) processing implemented via adequate SW and/or HW resources, such as computer-implemented artificial neural network processing. Artificial neural network processing implemented via a microprocessor/microcontroller is exemplary of neural network (NN) processing as considered herein.

No training: an (artificial) neural network can be left untrained but its weights can be sampled based on a known probability distribution with known parameters. For instance, the NN can be run inside a microcontroller without the need to train it.

Concept Drift Detector or CDD: this is indicative of circuitry (SW and/or HW) configured to detect stable conditions and triggers learning; a CDD also detects transients. A CDD as proposed herein is not unduly complex and can run on a microcontroller.

Normalization process with scalers pool: this is indicative of circuitry (SW and/or HW) configured to implement a normalization process which keeps track of the scalers used in the learning process. Similarity metrics are used at run time to pick up a scaler from the pool of known scalers.

Multiple inferences: this designation applies to processing can be implemented (via SW and/or HW circuitry) in order to obtain a probabilistic output about the anomaly also for different weight variances.

A device 10 as exemplified in FIG. 1 may comprise:
- at least one sensor 12, configured to record time-series S of signal samples indicative of a state of a dynamical system; for instance, the sensor 12 may comprise an inertial sensor configured to record acceleration as an indicator of system vibrations, as mentioned in the foregoing;
- a processing circuit 14, coupled to the sensor 12 and configured to process the time-series S recorded thereby; the related processing may comprise ANN processing; the circuit 14 may comprise, for instance, an STM32 micro-controller as currently available with companies of the ST group, and
- a (non-volatile) memory circuit block 16, coupled to the processing circuit 14 and configured to store parameter values, such as, for instance, possible probability distribution functions from which to draw values for weights to be used in NN processing: these values may be used to "ignite" a machine learning model used in ANN processing.

A device 10 as exemplified herein may be supplemented with networking circuitry and elements (e.g., cables, antennas, modem/router Internet interfaces, and so on) configured to facilitate transmission of message signals T. For instance, alerting messages may be transmitted via these networking facilities to a "user" U (a controller U of the dynamical system, for instance) if a malfunctioning state of the dynamical system is detected.

For the sake of simplicity, the principles underlying one or more embodiments will be discussed in the following mainly with respect to a (single) accelerometer sensor 12. It will be otherwise understood that both the type of sensor or sensors and the number of sensors considered is purely exemplary and not limiting. Various embodiments may use different types of sensors (inertial sensors such as pressure sensors, gyroscopes, and so on) in any number as desired.

Generally speaking, a state of a dynamical system exists and evolves (for instance, in time) according to some (unknown) function Φ.

For instance, such a state can be modelled to exist within a certain manifold M. In mathematics, the designation manifold applies to a topological space that locally resembles a Euclidean space near each point. More precisely, each point of an n-dimensional manifold (n-manifold) has a neighborhood that is homeomorphic to the Euclidean space of dimension n.

The evolution dynamics of such a state can be observed, for instance, as values $x\_1, \ldots, x\_n$ in a set of real numeric values R, by some observation (measurement) function g. This may correspond to a sensed signal S, which may be modeled as a time-series data vector belonging to a vector space $\mathbb{R}^D$, e.g. $S \in \mathbb{R}^D$.

For instance, such time-series of sample data S may be sensed by a tri-axial accelerometer 12 coupled to an object in motion with variable acceleration as, e.g., a vibrating portion of a motor.

Figure 2:
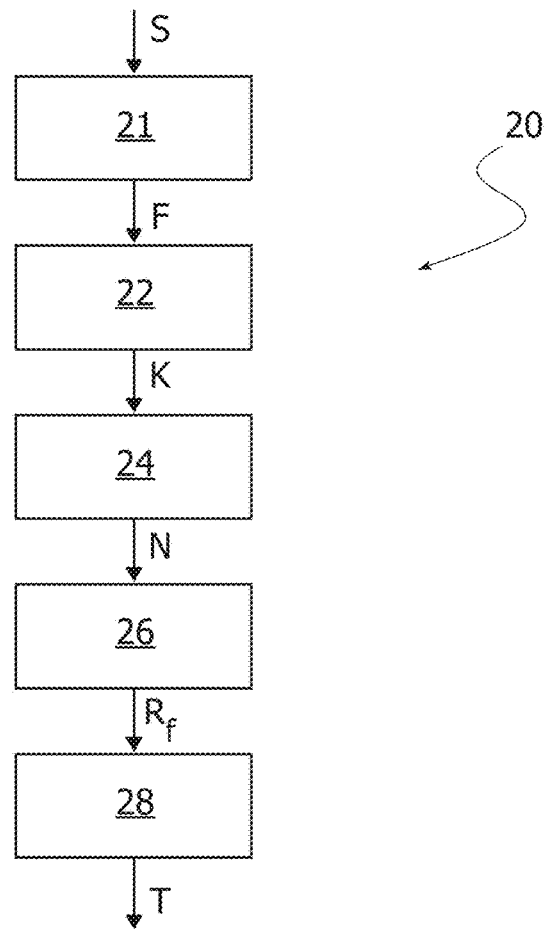
FIG. 2 is a diagram exemplary of a method as exemplified herein.

The processing circuit 14 as exemplified in FIG. 1 may be configured to perform data processing on the signals S as exemplified at 20 in FIG. 2.

As exemplified in FIG. 2, such data processing may comprise a data processing pipeline (suited to be computer-implemented) including:
- a pre-processing stage 21 configured to receive the set of time-series S from the sensor 12 and apply thereto domain transformation processing, such as FFT processing, for instance; such transformation processing may lead to recasting the set of time-series S in the form of a transformed dataset F as a result of such a domain transformation processing application,
- a concept drift detector (CDD) stage 22, configured to receive transformed data F from the pre-processing stage 21 and analyze it in order to compute scaler values T therefrom; this facilitates determining when (and for how long) the system monitored has reached a stable operating condition. For instance, if the stable condition persists for a period of time, the system can be considered to be in a "normal" operating condition with a process of "learning" applied to incorporate/learn it, as discussed in the following;
- one or more data normalization stages 24, configured to receive the set F of transformed segments of the time series S from the pre-processing stage 21 and, optionally, the scaler data K stored in memory 26. As exemplified herein, the normalization stage 24 is configured to perform normalization processing of such transformed data F either generating or using a scaler data K, producing a normalized dataset N as a result; as a result, a substantially flat threshold τ, for instance, may be used to discriminate normal operating conditions from anomalies in processing the normalized dataset N;
- an ANN processing stage 26, including an (artificial) neural network topology substantially akin to an autoencoder stage, for instance. As exemplified herein, the ANN processing stage 26 is configured to receive the normalized dataset N and apply constrained random inference thereto without a formal training of the ANN; for instance, the weight values can be initialized using random values drawn from a known probability distribution with known parameters (e.g. normal distribution with known mean and variance, or uniform distribution, and so on), as discussed in the following; the ANN stage may output a reconstructed signal Rf;
- a decision stage 28, configured to receive reconstructed data Rf from the ANN stage 26 and compare such reconstructed data Rf with the (normalized) transformed data N (obtained from the transformed data F resulting from the pre-processing stage 21 as discussed previously) and compute an error of reconstruction c as difference therebetween, for instance; the decision stage 28 may produce a signal T indicative of either normal or faulty behavior of the system as a function of whether the reconstruction error c computed is found to be above or below a certain threshold value.

For instance, in case the reconstruction error c is above a certain threshold value T, e.g., $\varepsilon > \tau > 0$, this may be indicative of a faulty behavior; consequently, the decision stage 28 may provide the signal T to the user circuit U. This may result in a warning signal being issued indicating a faulty behavior detected, as discussed in the foregoing.

Figure 3A:
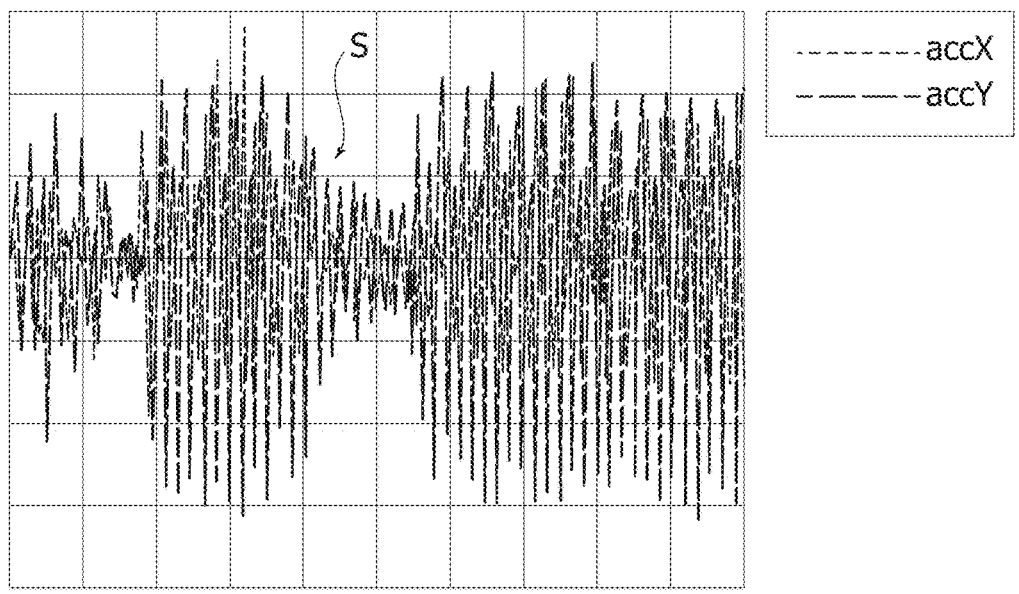
FIGS. 3A to 3C are exemplary plots of possible signals which may be processed using the method of FIG. 2.

As exemplified in FIG. 3A, the accelerometer sensor 12 may provide a set of time-series S as a system state measurement. This may include, for instance, a set of three time-series a_x, a_y, a_z wherein each time series is indicative of acceleration along an axis in a cartesian 3D coordinate system.

As exemplified herein, each time series a_x, a_y, a_z may be split or "chunked" in a number N of segments $S_1, \ldots, S_N$ prior to applying domain transformation processing, the segments $S_1, \ldots, S_N$ having a certain time length P (corresponding to a certain number of samples); for instance, such splitting may comprise sliding, with a discrete time step $\Delta t$, a fixed-size (time) window mask, of a size P, for instance, onto the respective time series a_x, a_y, a_z and producing a series of segments S1, S2, S3 each equal to a chunk of the input vector S having length P given by the fixed-size window mask.

As discussed in connection with FIG. 2, the pre-processing stage 21 may implement one or more conventional data processing procedures, for instance (Fast) Fourier Transform—FFT—processing.

Data processing as discussed in Italian Patent 102019000015491 filed on Sep. 3, 2019 may be exemplary of other pre-processing suited for use in embodiments.

The document referred to in the foregoing (not yet available to the public at the time of filing the instant application) discloses a method of processing at least one sensing signal received from a sensor (such as 12 herein, for instance) coupled to a dynamical system evolving over time, wherein the at least one sensing signal comprises a time-series of signal samples (for instance, S).

Briefly, such a method may comprise:
high-pass filtering the time series of signal samples to produce a filtered time series therefrom,
applying delay embedding processing to the filtered time series, wherein the delay embedding processing comprises:
i) providing a first delay embedding parameter and a second delay embedding parameter, the first and second delay embedding parameters indicating a dimension for a matrix and a time delay, respectively,
ii) producing a set of time-shifted time series of signal samples, the set of time-shifted time series including a number of time-shifted replicas of the filtered time series, that number being equal to the matrix dimension indicated by the first delay embedding parameter decremented by one, the time-shifted replicas of the filtered time series being mutually shifted over time of a time-delay equal to the time delay indicated by the second delay embedding parameter,
producing a first matrix, wherein producing the first matrix comprises storing the set of time-shifted time series as an ordered list of entries in the first matrix,
applying a first truncation to the first matrix (MX) to produce a second matrix, wherein the first truncation comprises truncating the entries in the ordered list of entries at one end of the first matrix to remove a number of items from these entries, that number equal to the product of the first delay embedding parameter decreased by one times the second delay embedding parameter,
applying entry-wise processing to the second matrix, wherein applying entry-wise processing comprises selecting at least one processing pipeline among a first processing pipeline and a second processing pipeline, the at least one processing pipeline comprising performing Kernel Density Estimation, KDE, and providing a set of estimated kernel densities and/or a set of images generated as a function of the set of estimated kernel densities, the set of estimated kernel densities and/or the set of images generated as a function of the set of estimated kernel densities being indicative of the state of the dynamical system, and
forwarding the set of estimated kernel densities and/or the set of images generated as a function of the set of estimated kernel densities to a user circuit.

Figure 3B:
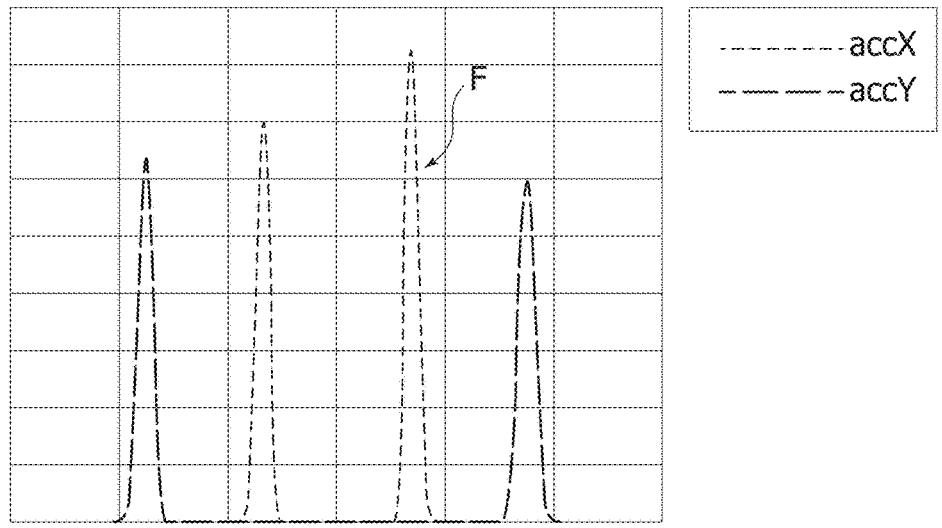
Figure 3C:
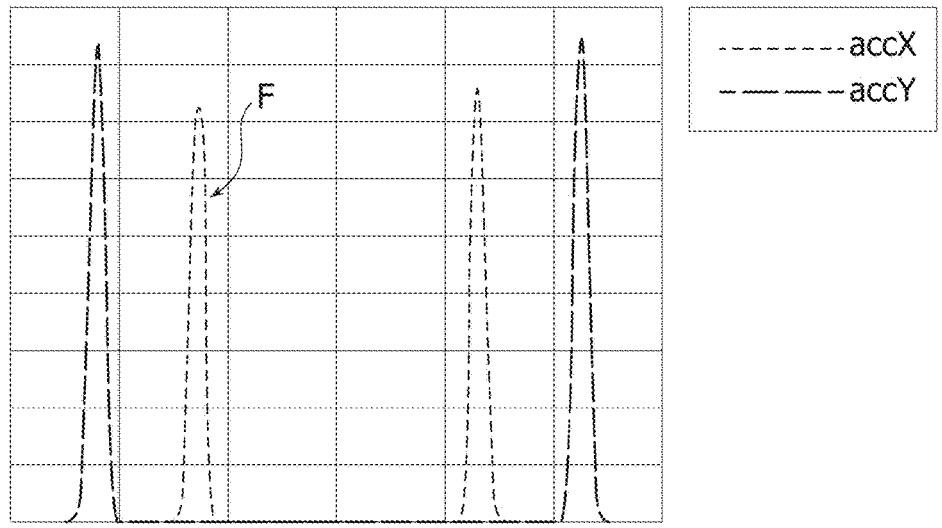

FIGS. 3B and 3C are exemplary of "signature" signals which may be produced in order to facilitate data pre-processing in the pre-processing stage 21.

Processing a plurality of segments obtained by (time) splitting a single signal S will be discussed in the following for the sake of simplicity. It will be otherwise understood that such a "unidimensional" data processing is purely exemplary and not limiting.

Figure 4:
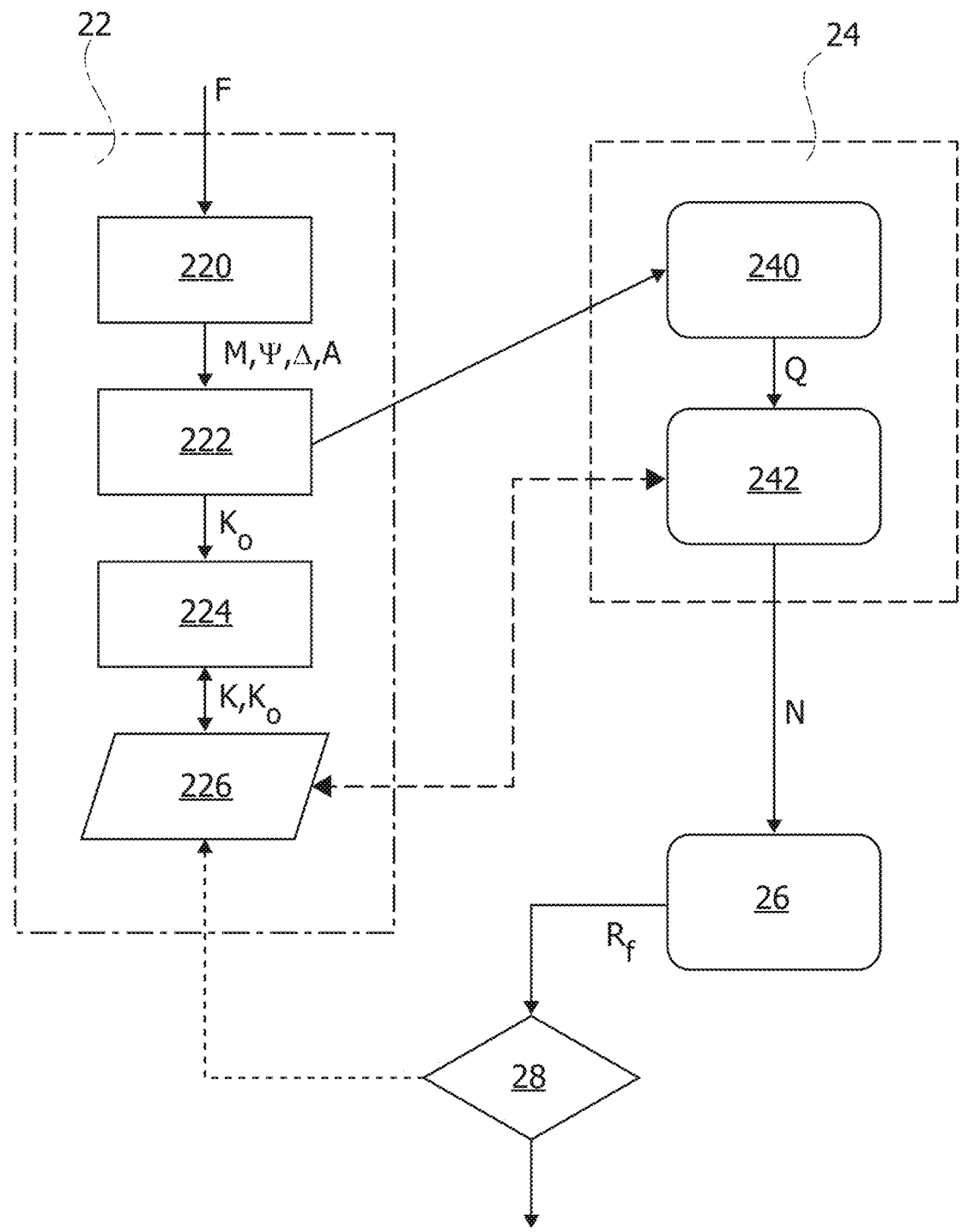
FIG. 4 is a diagram of a data processing method as per the present disclosure.

FIG. 4 is an exemplary diagram of a "bootstrap" phase during which data processing as represented by 20 in FIG. 2 is performed.

As discussed, the set of transformed segments F may be provided to the CDD stage 22 and to the normalization stage 24, e.g., in parallel.

As exemplified in FIG. 4, the CDD stage 22 may comprise:
a first CDD processing stage 220 configured to apply data processing operations to the transformed data F and to produce, as a result of such processing, a set of signals M, Ψ, Δ indicative of "normal" operational conditions of the dynamical system;
a second CDD processing stage 222 configured to receive the set of signals M, Ψ, Δ from the first CDD processing stage 220 and to apply signal analysis thereto in order to detect "stable", regular operating conditions and providing a data buffer A comprising transformed data F related to such normal conditions detected, and
a scaler similarity processing stage 224 coupled to a memory block 226 and configured to compare a pair of vectors K0 and with scaler vectors K stored in the memory block 226 forming a pool of stored scalers, the processing stage 224 configured to retrieve a closest scaler from such a stored pool of scalers as a result of the performed comparison.

As exemplified in FIG. 4, the first CDD processing stage 220 may be configured to:
buffer, e.g., sequentially, a number of N transformed data segments $F_1, \ldots, F_N$ of the received transformed data F, each segment having a certain length P, where buffering comprises storing such segments $F_1, \ldots, F_N$ as entries, such as rows, for instance, of a matrix A operating as data buffer, e.g., with a first-in-first-out (FIFO) logic, the matrix A having a size of N rows and P columns and which may be expressed, for instance, as:

$$A = \begin{pmatrix} F_1 \\ \vdots \\ F_N \end{pmatrix} = \begin{pmatrix} f_{11} & \cdots & f_{1P} \\ \vdots & \ddots & \vdots \\ f_{N1} & \cdots & f_{NP} \end{pmatrix};$$

compute field-wise, namely column-wise, for instance, mean $m_i$ and variance $\sigma_i$ values of each i-th field/column of the matrix A, thus obtaining a pair of vectors K0 which may be expressed as, for instance:

$$K_o = \begin{cases} \mu_o = (m_1, \ldots, m_i, \ldots, m_p) \\ \sigma_o = (\sigma_1, \ldots, \sigma_i, \ldots, \sigma_p) \end{cases}$$

add up all the computed mean mi and variance σi values in the respective computed vectors, obtaining a pair of (scalar) indicators M, Ψ whose value at a certain time t may be expressed as:

$$M(t) = \sum_{i=o}^{P} m_i$$
$$\Psi(t) = \sum_{i=o}^{P} \sigma_i ;$$

calculate a differential drift signal δ as a product of the time derivatives of the respective indicators M, Ψ; such a differential drift signal Δ may thus be expressed as:

$$\Delta = \frac{(M(t) - M(t - \Delta t))}{\Delta t} \cdot \frac{(\Psi(t) - \Psi(t - \Delta t))}{\Delta t} = \delta M \cdot \delta \Psi = M'^* \cdot \Psi'$$

Figure 5A:
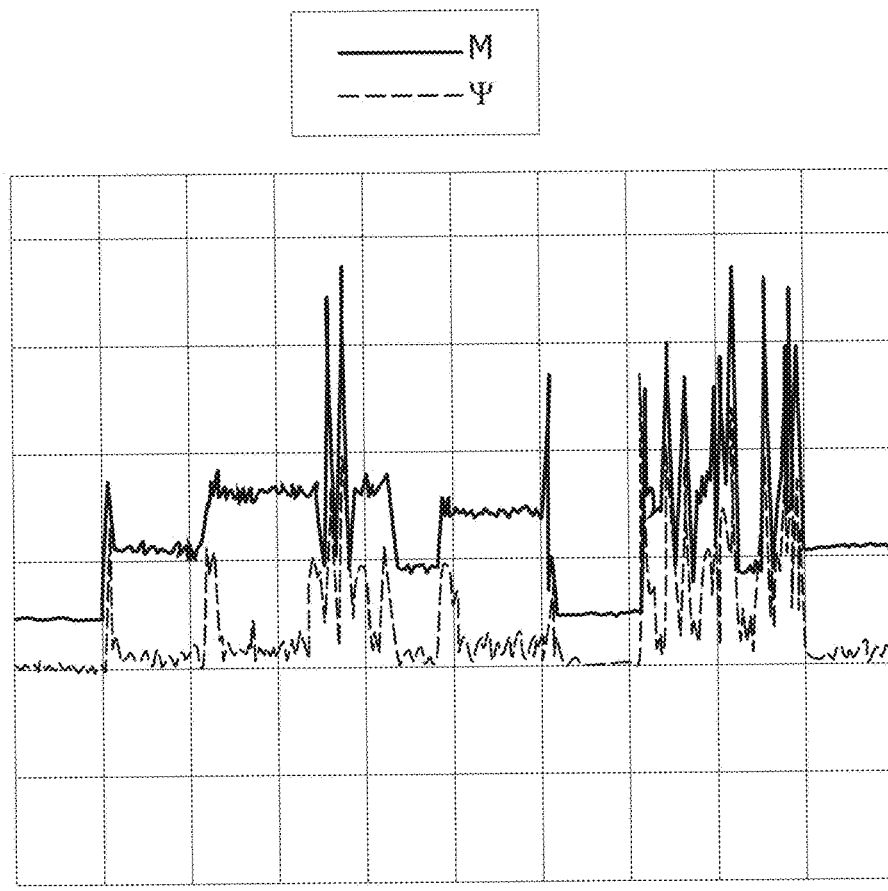
FIGS. 5A and 5B are exemplary plots of exemplary signals processed in the method of FIG. 4.
Figure 5B:
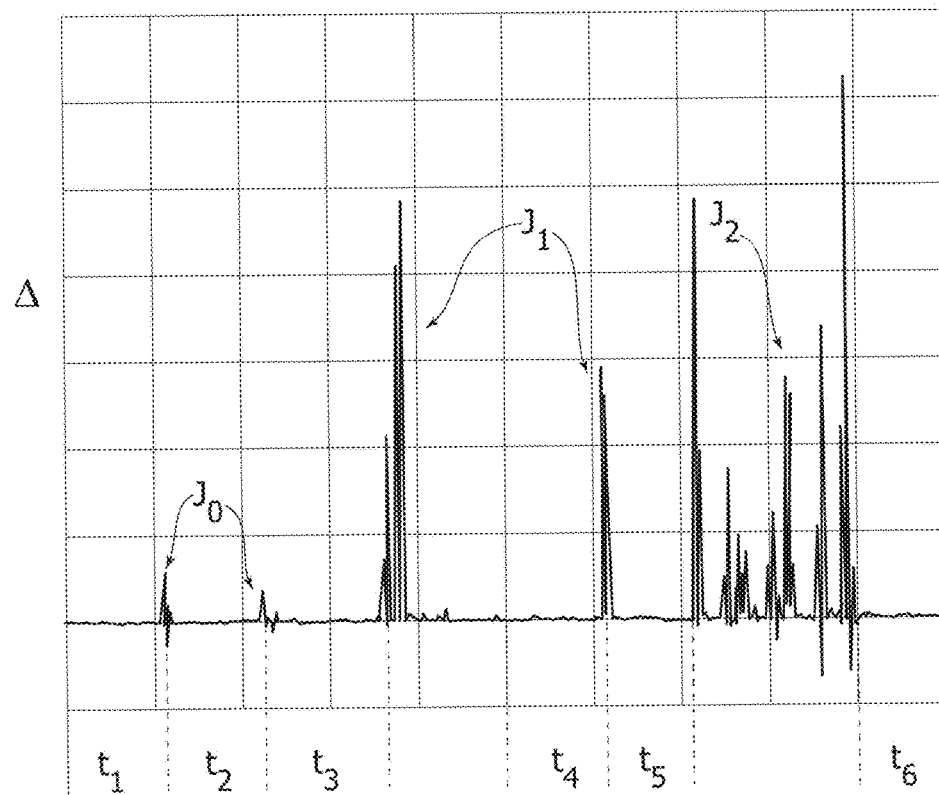

FIGS. 5A and 5B are exemplary time diagrams of calculated indicators and signals M, Ψ, Δ.

As exemplified in FIG. 5B, the differential drift signal Δ may be helpful in detecting changes of operational modes of the dynamical system.

The diagram of FIG. 5 is exemplary of how the drift signal Δ facilitates CDD processing in separating normal operating modes and transitions therebetween in the (exemplary) case of a system comprising an electric motor.

As exemplified in FIG. 5B, such a signal may comprise:
 indicators J0 of "speed jumps", that is abrupt variations in the values of motor speed, which facilitates discriminating stable operating intervals t1, t2, t3 at a speed reached by the motor as a result of jumping, e.g., from 1800 to 3600 rpm;
 indicators J1 of "speed ramps", that is continuous variations in the values of motor speed, e.g., from 1800 rpm to 3600 rpm and vice versa, which again facilitate discriminating stable operating periods t4, t5 of the motor at a speed to which it has jumped,
 indicators J2 of fast, random, speed changes, that is abrupt, noisy, variations in the motor speed, which facilitate discriminating a stable operating period t6 of the motor at the end of such a change.

As exemplified herein, intervals t1, t2, t3, . . . , t6 may be deemed stable insofar as their length is above a certain threshold, e.g., a user-defined predetermined threshold. For each "stable" interval t1, t2, t3, . . . , t6 the matrix A may comprise those segments $F_1, \ldots, F_N$ of the transformed data F, obtained as a result of applying data transformation processing 21 to portions of the time-series S, which fall within respective stable intervals $t_1, \ldots, t_6$.

As exemplified in FIG. 4, the second processing stage 222 may provide to the normalization stage 24 the data buffer A to be further processed, as discussed in the following.

Optionally, the pair of vectors K0 may be compared at 224 with a plurality of scaler sets 226 which may be stored in a dedicated memory block, thus producing an indication of a (metric) distance between the pair of vectors K0 and each element K of the sets in the plurality of scaler sets 226.

Figure 6:
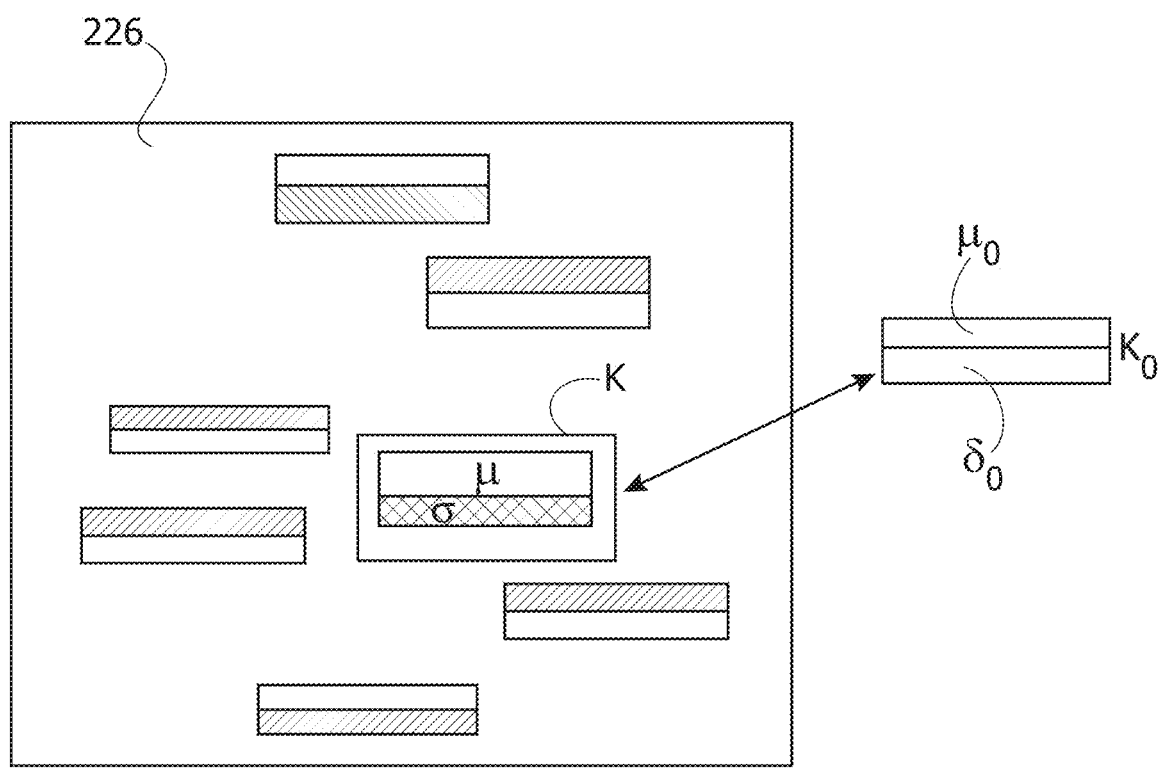
FIG. 6 is an exemplary diagram of principles underlying one or more embodiments.

FIG. 6 is an exemplary diagram showing a possible outcome of the comparison, leading to selecting a "closest" scaler K according to some "similarity metric", e.g., Euclidian norm or cosine similarity (these are merely examples, of course) as known to those of skill in the art.

The closest scaler K among those stored in the memory 226 may be the one having a least (minimum) distance to the computed "online" pair of vectors K0. In one or more embodiments, the runtime rescaling coefficients K may be obtained from a small mini-batch representing stable conditions detected from the CDD first processing stage 220.

As exemplified in FIG. 4, the selected scaler set K may be provided, together with the "stable" data buffer A, from the CDD stage 22 to the normalization stage 24.

As exemplified in FIG. 4, the normalization processing stage 24 may implement:
 first normalization processing 240 applied to the data buffer A using, for instance, a softmax normalization function, producing a dataset Q normalized between 0 and 1, optionally a "low temperature" softmax processing so that small noisy peaks can be attenuated as discussed in the following;
 second normalization processing 242 applied to the dataset Q resulting from the first normalization processing application 240, the second normalization processing 242 using, for instance, a "mapminmax" rescaling function, providing a normalization scaler set as a result.

As discussed, the first normalization stage 240 as exemplified in FIG. 4, may implement a so-called "low-temperature" softmax processing, where each j-th value $f_j$ of transformed data F in the input buffer A may be treated as a "logit". That is, the first normalization stage 240 may model a j-th element $f_{ij}$ of the i-th entry $F_i$ of the buffer A among the N buffered "stable" entries in the data buffer A as a j-th "logit" value.

The term "logits" may refer to raw scores output by a last layer of a neural network, before activation takes place. As discussed herein, the term "logits" refers to (e.g., FFT processed) buffered data A as soft-max processing 240 is used as a filter rather than as a last layer of a neural network".

As a result, the first normalization stage 240 may comprise an inverse transformation from the logit domain of the values of elements of the transformed data portion $F_A$.

A k-th element of the matrix Q resulting from such an inverse transformation applied to the data buffer A may be expressed as:

$$q_{i,j} = \frac{e^{\left(\frac{f_{ij}}{T}\right)}}{\Sigma_k e^{\left(\frac{fkj}{T}\right)}}$$

where
 T is a "temperature" parameter which may be selected by the user.

The first normalization stage 24o may thus produce a matrix Q where each ij-th element $q_{ij}$ is obtained as the inverse transformations of the original logit value.

Advantageously, in one or more embodiments, a relatively low temperature parameter value T (e.g., T=0.08) may be selected, such that small coefficients in the transformed data vector (which may correspond to small amplitude variations) are not completely neglected.

Figure 7A:
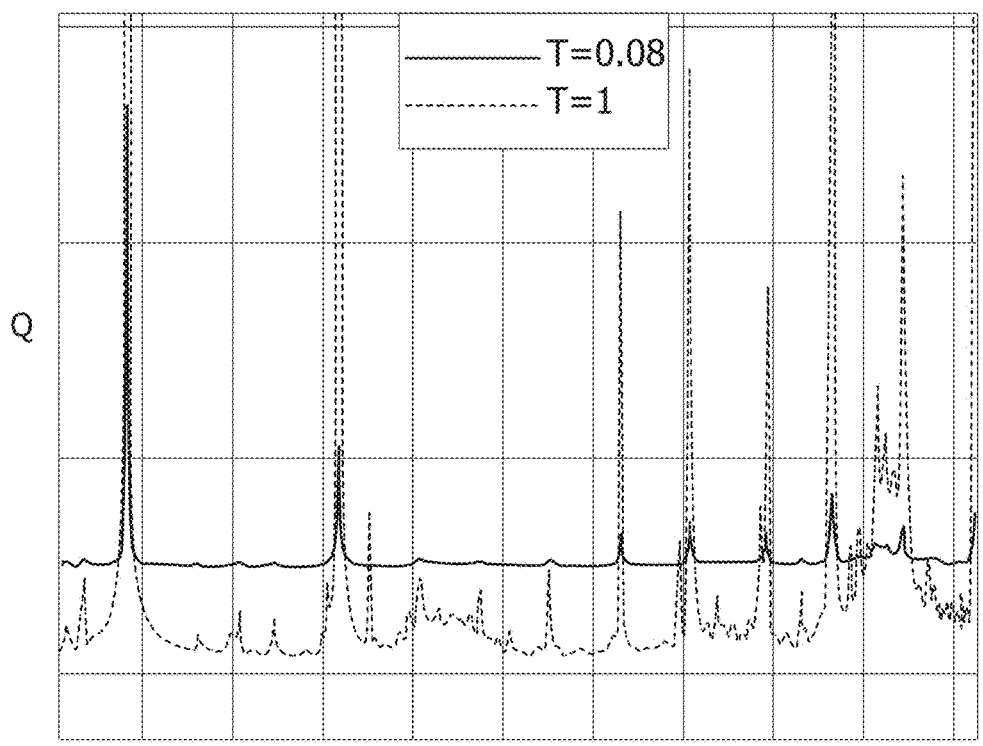
FIGS. 7A and 7B are exemplary plots of exemplary signals processed in the method of FIG. 4.

In other words, the first normalization stage 240 may operate as a machine-learning noise filter, removing less significant elements from the processed portion of the input data. This may be appreciated, for instance, in FIG. 7A, which shows a comparison between the output of the first normalization stage 240 using a temperature of T=1 and using a temperature T=0.08.

As discussed, the second normalization stage 242 as exemplified in FIG. 4 may implement a "mapminmax" function; this may be expressed as a function which processes matrices in a manner known per se, for instance by mapping row-wise minimum and maximum values onto a range [−1 1].

For instance, such a mapminmax function may produce a normalized matrix N which may be expressed as:

$$N = \left( \frac{Q_1 - \mu}{\sigma} \ldots \frac{Q_P - \mu}{\sigma} \right)$$

where
$Q_1, \ldots, QP$ are fields, e.g., columns, of the matrix Q, $\mu$ and $\sigma$ are a pair of vectors whose values are obtained as a result of computing column-wise mean and variance values of the matrix Q received from the first normalization processing.

In one or more embodiments, such pair of vectors $\mu$ and $\sigma$ may be used as pair of vectors K0 as discussed in the foregoing (see, e.g., the discussion related to FIG. 6).

Figure 7B:
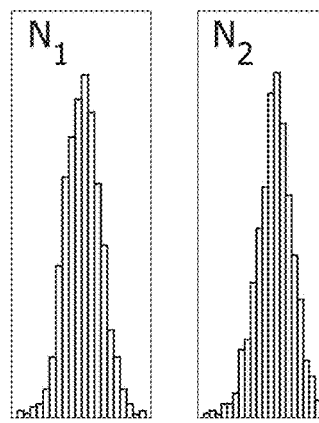

As exemplified in FIG. 7B, in the hypothesis that N relates to "normal" conditions, the produced (normalized) dataset N may have columns, e.g., $N_1, N_2, N_3$, whose values forming a smooth distribution, as exemplified in FIG. 7B.

Figure 7C:
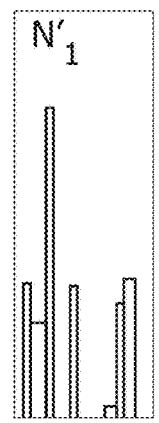
FIG. 7C is an exemplary plot of the data output by the second normalization having a random distribution.

One or more embodiments may be based on the observation that the normalization 242 performed using scalers K retrieved from the storage pool 226 may produce a "correctly" normalized dataset N only if the segments of transformed data F accumulated in the data buffer A are indicative of regular, stable operation conditions. Conversely, performing the normalization 242 using scalers retrieved from the storage pool 226 may lead to obtaining an error amplification in case the portion of data accumulated in the data buffer A corresponds to faulty operation. This is shown, for instance, in FIG. 7C where data output by the second normalization stage 242 may have a completely random distribution N1', N2', N3'.

Stated otherwise, the selected scaler set K may be used as an error amplifier to facilitate subsequent neural network processing 26, as discussed in the following.

Figure 8:
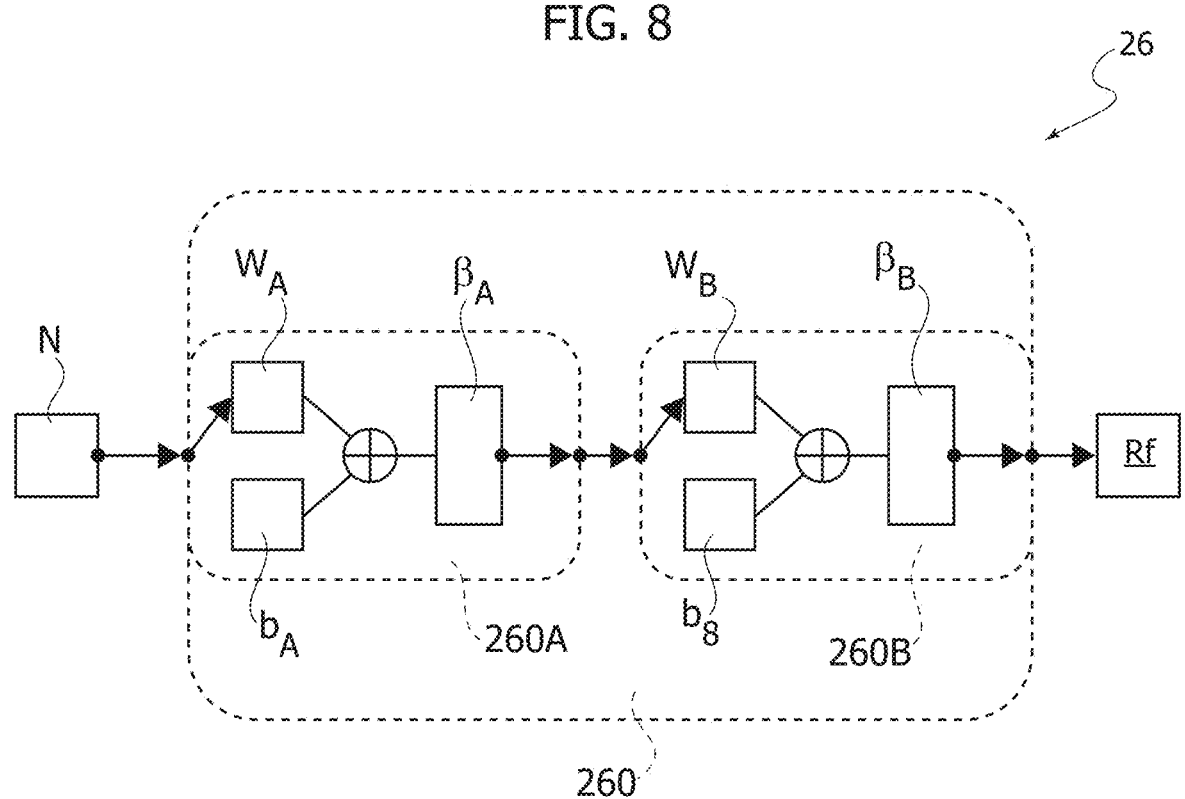
FIG. 8 is a diagram of principles underlying neural network processing.

FIG. 8 is an exemplary diagram of a possible network topology of an artificial neural network (or machine learning) processing stage 26.

In one or more embodiments, the ANN stage 26 may implement stacked auto-encoder (briefly, SAE) processing 260.

As exemplified in FIG. 8, the SAE processing pipeline 260 comprises:
an input layer, configured to receive the data N from the normalization stage 24, specifically to receive the output from the second normalization dataset 242,
a first "encoder" processing layer 260A, coupled to the input layer and configured to receive the data N from the normalization stage 24 and to apply data compression thereto, using a first set of weight values W_A which may have values drawn from a type of continuous probability distribution for a real-valued random variable, e.g. uniform or Gaussian distribution;
a second "decoder" processing layer 260B, coupled to the first encoder layer 260A and configured to receive such compressed data and apply data de-compression thereto, producing an output dataset Rf which may comprise a "copy" of the initial dataset N, the decoder using a second set of weight values $W_B$;
an output layer coupled to the second layer 260B configured to provide the computed output dataset Rf.

The input layer and the output layer may be indicative of a number of "slots" or "perceptrons" available for input or output in the ANN stage 26. For instance, the input layer may provide space for a number of input data, e.g. for a number k of input data points equal to the number of samples in the normalized dataset N, e.g. k=512.

In one or more embodiments, the first 260A or second 260B layers may comprise so-called "hidden layers" comprising perceptrons coupled to other neurons in the network and hence not directly accessible from input and output layers. This indicates that processing may occur with a higher number and more complex architecture of perceptrons than in a single layer, in a way per se known to those of skill in the art. Increasing the number of neurons in the hidden layer may facilitate reducing possible ambiguities.

An i-th perceptron may be identified in the set of n perceptrons by a tuple of values $(w_1, b_1, \beta_i)$, comprising a weight value $w_i$ and an offset value $b_i$ and an activation function $\beta_i$. In one or more embodiments, for instance, for respective first 260A and second 260B layer:
a set of weighting values may be referenced as $W_A$, $W_B$
a set of bias values may be referenced as $b_A$, $b_B$,
a set of activation functions may be referenced as $\beta_A$, $\beta_B$.

It is noted that even if the symbols used are different, the values and functions may be the same for the first 260A and second layers 260B, e.g. first and second layer may have an equal set of activation functions $\beta_A = \beta_B$.

In one or more embodiments, values of the first set of weights $W_A$ may be set equal to random values drawn from a known distribution of (pseudo-)random numbers. The values of the weights in the second set $W_B$ may be equal to a transposed version of the first set $W_A$.

In one or more embodiments, weight values $W_A$ may be randomly selected and the ANN stage 26 may produce a meaningful output without any "training" of the weight values $W_A$.

As exemplified in FIG. 4, the reconstructed signal Rf produced by the ANN processing stage 26 is provided to the decision block 28. Such a decision block 28 is configured to compare the reconstructed data Rf with the normalized data N, to compute an error of reconstruction c as a difference between the input normalized data N and the reconstructed data Rf, and to compare such error c with a pre-set, customizable, threshold vale $\tau$, for instance.

In a bootstrap phase as exemplified in FIG. 4 (which may be considered as a sort of initial "learning" phase) the computed error difference $\varepsilon$ being above the pre-set threshold $\tau$ may indicate that the operating condition is unknown to the system. The pair of vectors K0 previously computed, e.g. as a result of performing normalization processing 24, may be added to the pool K of scalers stored in the memory block 226. Subsequently, processing 24, 26 may be repeated using the computed online scaler K0 in place of the "closest" one selected previously, as indicated by the path in dashed line in FIG. 4.

Still in a bootstrap phase as exemplified in FIG. 4, if the computed error difference c is below the threshold value T, the previously computed "online" scaler K0 is simply "forgotten" (e.g., discarded) insofar as an indication may be held to exist that data processed corresponds to a known, learnt "normal" or "stable" condition of the system.

Figure 9:
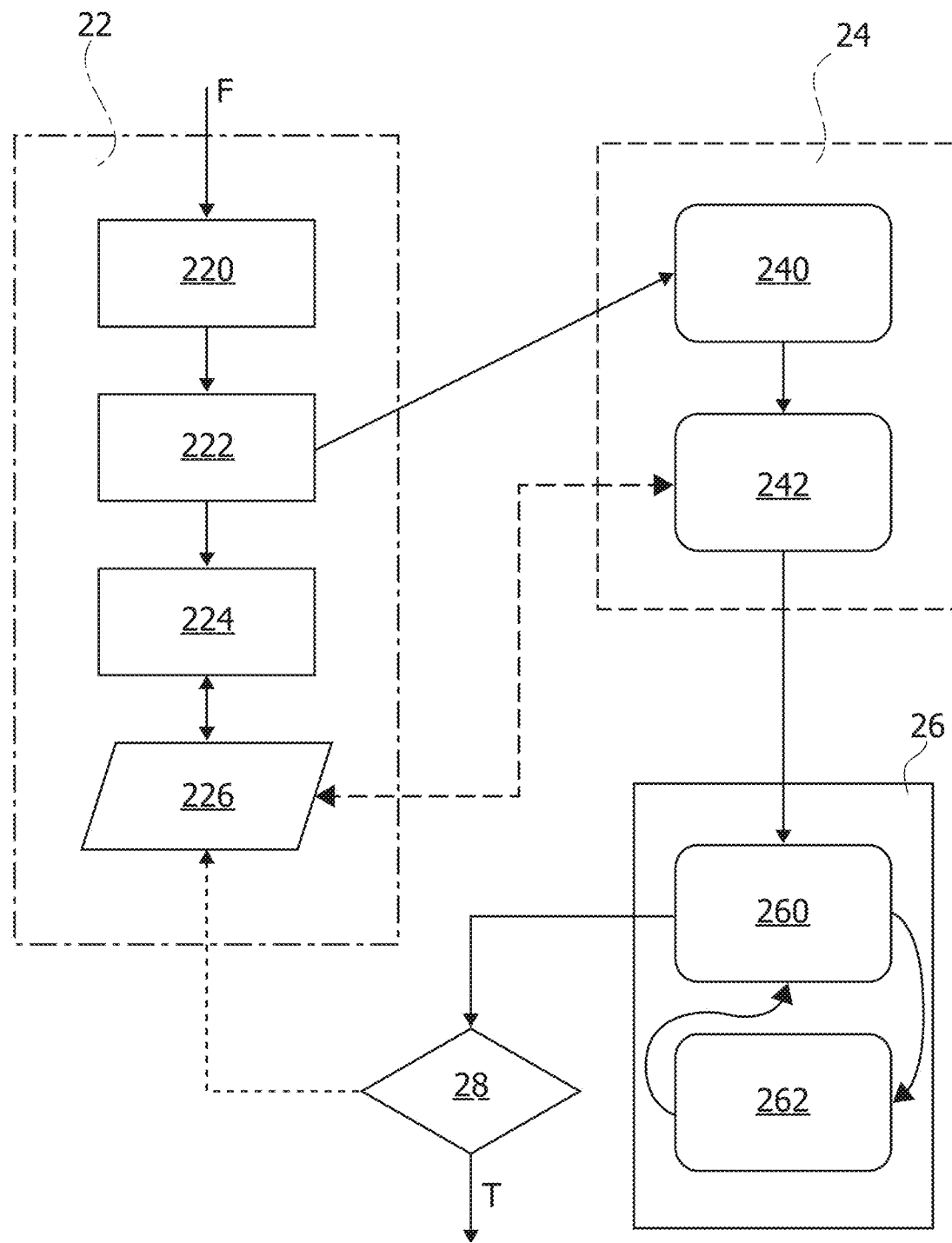
FIG. 9 is a diagram of a data processing method as per the present disclosure.

FIG. 9 is exemplary of the method of FIG. 4 used in an "inference" phase, once the pool of scalers has been populated.

For the sake of simplicity, like reference numbers are used for like processing stages in FIGS. 4 and 9, so that a detailed explanation of the respective functions will not be repeated for brevity.

As exemplified in FIG. 9, when in such an inference phase, the ANN stage 26 may comprise, in addition to the auto-encoder stages 260, a random weight generator stage 262, which may be used to perform multiple constrained interferences, as discussed in the following.

The ANN stage 26 may be indicated also as a CRWNet, as an acronym of Constrained Random Weights Network.

As mentioned, an auto-encoder as exemplified herein may use some weight values Wa drawn from a random distribution produced by a random (numbers) generator stage 262.

One or more embodiments may exploit the observation that (transformed data) signals having similar characteristics may be produced such that the summation of the mean squared error (MSE) between input and output sums up approximately to a same (constant) value.

Drawing weight values from zero-centered distributions (that is having zero average value) may be advantageous in order to facilitate induced sparsity and controlled oscillations in the reconstructed output Rf.

Figure 10:
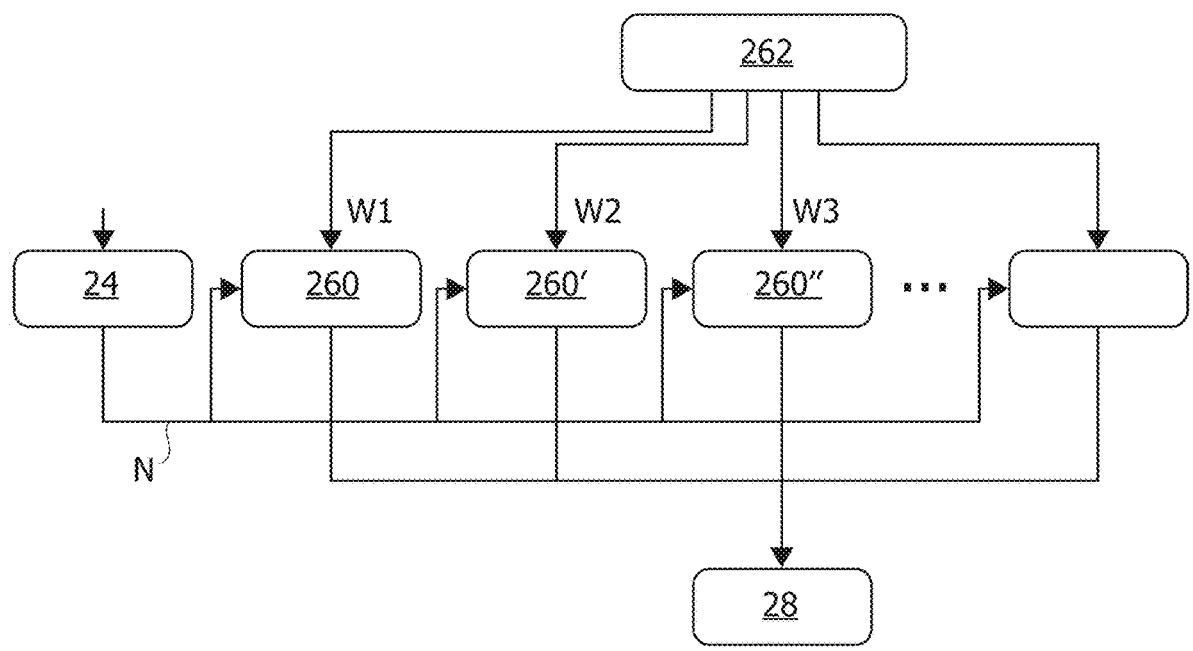
FIG. 10 is an exemplary diagram of principles underlying a portion of the method of FIG. 9.

As exemplified in FIG. 10, the weights in the first and second ANN stages 260A, 260B in 260 can be initialized multiple times by sampling multiple times a same type or different types of pseudo-random distributions.

As exemplified in FIG. 10, this may result in processing the normalized dataset N with a same neural network instance 260 having different initial weight values, which is essentially similar to having each processing iteration performed with a different neural network application.

For instance, as exemplified in FIG. 10:
a first set of weight values W1 may be produced by the generator 262, for instance as a result of drawing values from a normal distribution with a first mean value, e.g., $\mu 1=0$, and a first standard deviation parameter, e.g., $\sigma 1=0.05$; a first ANN processing 260 may be applied to the normalized data N from the normalization stage 24 using the first set of weights W1;
a second set of weight values W2 may be produced by the generator 262, for instance for instance as a result of drawing values from a normal distribution with a first mean value, e.g., $\mu 2=0$, and a first standard deviation parameter, e.g., $\sigma 2=2$; a second ANN processing 260' may be applied to the normalized data N from the normalization stage 24 using the second set of weights W2;
a third set of weight values W3 may be produced by the generator 262, for instance for instance as a result of drawing values from a normal distribution with a first mean value, e.g., $\mu 1=0$, and a first standard deviation parameter, e.g., $\sigma 1=100$; a third ANN processing 26o may be applied to the normalized data N from the normalization stage 24 using the third set of weights W3;
and so on, for a notionally unlimited number of times.

As a result of such multiple iterations, a plurality of reconstructed datasets Rf, Rf', Rf" may be produced by respective ANN iterations 260, 260', 260" which may be provided to the decision block 28.

Such a decision block 28 may compare one or more of the reconstructed datasets in the plurality of reconstructed datasets Rf, Rf', Rf" with the pre-set threshold, advantageously increasing robustness of the classification of the operating mode as a normal mode or raising an alert in case any faulty behavior is detected.

As exemplified in FIG. 10, the decision block 28 may compute a probability score based on the output of the sequence of constrained random inferences 260, 260', 260".

For instance, if a plurality of inference iterations, e.g. 10 iterations, are performed and a substantial fraction, e.g. 8 out of 10, lead to an anomaly detection after T, then the decision block may provide a corresponding anomaly score, e.g. about 80% in the considered example.

In one or more embodiments, performing multiple inferences may facilitate separating normal condition from anomaly, e.g., faulty conditions, in case of ambiguity (e.g., due to a high standard deviation or variance of the distribution from which weights are drawn).

In one or more embodiments, a set of parameters of the ANN processing stage 26 may be selectable, the set of parameters comprising:
probability distribution type, and respective probability distribution parameters,
number of layers/neurons for the CRWNet 260,
activation functions $\beta$ for ANN layers 260A, 260B.

For instance, it may be advantageous to use a hyperbolic tangent as the activation function, e.g., $\beta=\tanh(x)$, as such a function produces weight values in a certain range, e.g. between −1 and 1, and has zero crossing.

It is noted that such an activation function is purely exemplary and not limiting, being otherwise understood that (virtually) any activation function may be found suitable for use in one or more embodiments.

Figures 11A, 11B, 11C:
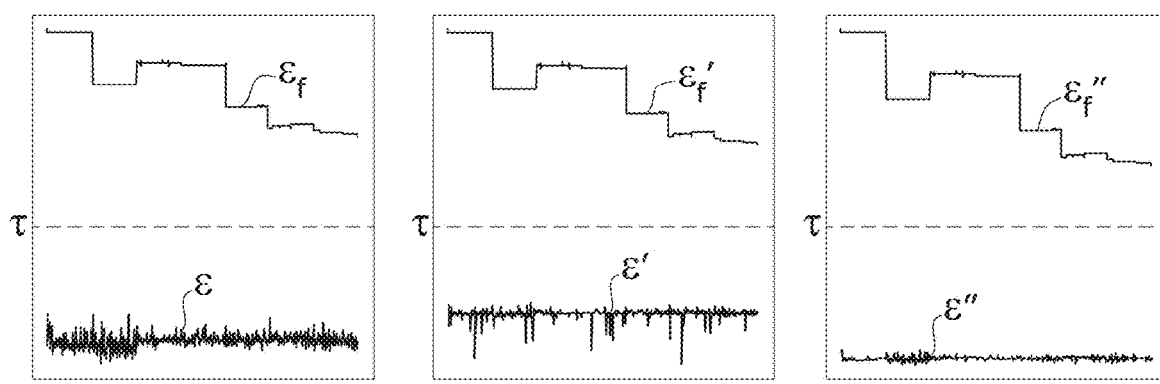
FIGS. 11A to 11C are exemplary diagrams of possible signals processed using the method as exemplified herein.

FIGS. 11A to 11C are exemplary diagrams of possible signals processed using the method as exemplified herein.

For instance:
FIG. 11A is exemplary of results which may be obtained setting the SAE stage 260 to have: a first activation function $\beta_A$, $\beta_B$, ($\beta_A=\beta_B=\tanh(x)$, for instance), one hidden layer, and weight values $W_A$ drawn from a Gaussian normal distribution provided by the generator 262 having zero average and a first standard deviation value $\sigma 1$ (e.g., $\sigma 1=0.05$);
FIG. 11B is exemplary of results which may be obtained setting the SAE stage 260 to have: a first activation function $\beta_A$, $\beta_B$, ($\beta_A=\beta_B=\tanh(x)$, for instance), one hidden layer, and weight values $W_A$ drawn from a Gaussian normal distribution provided by the generator 262 having zero average and a second standard deviation value $\sigma 2$ greater than the first standard deviation $\sigma 1$ (e.g., $\sigma 2=2$);
FIG. 11C is exemplary of results which may be obtained setting the SAE stage 260 to have: a first activation function $\beta_A$, $\beta_B$, ($\beta_A=\beta_B=\tanh(x)$, for instance), one hidden layer, and weight values $W_A$ drawn from a Gaussian normal distribution provided by the generator 262 having zero average and a third standard deviation value $\sigma 3$ greater than the first and second standard deviations $\sigma 1$, $\sigma 2$ (e.g., $\sigma 3=100$).

As exemplified in FIGS. 11A to 11C, computed error differences $\varepsilon$, $\varepsilon'$, $\varepsilon"$ obtained for data corresponding to normal operating conditions are well above a threshold value τ while computed error differences $\varepsilon_f$, $\varepsilon_f'$, $\varepsilon_f''$ obtained for data corresponding to anomalous, e.g., faulty, operating conditions of the system are well below the threshold value.

Interestingly, increasing the variance of the distributions from which weight values WA are drawn may lead to an increased separation of the computer error $\varepsilon''$ $\varepsilon_f''$ from the threshold τ, advantageously facilitating robust detection of anomaly.

A computer-implemented method as exemplified herein, comprises:

receiving from a dynamical system evolving over time at least one sensing signal (for instance, 12) comprising a time-series of signal samples (for instance, S), applying (for instance, 21) domain transformation processing to the time-series of signal samples to produce a dataset of transformed signal samples (for instance, F) therefrom, applying drift detection processing (for instance, 22), to the dataset of transformed signal samples, wherein the drift detection processing comprises:
buffering (for instance, 220) of the transformed signal samples, obtaining a data buffer (for instance, A) having transformed signal samples as entries thereof,
computing (for instance, 220) statistical parameters (for instance, M, Ψ) of the data buffer,
producing a drift signal (for instance, Δ) indicative of the evolution over time of the dynamical system as a function of the computed statistical parameters,
selecting (e.g., keeping or discarding) transformed signal samples buffered in the data buffer as a function of the drift signal, applying normalization processing (for instance, 24) to the buffered transformed signal samples (for instance, F, A), the normalization processing comprising:
providing (for instance, 226) a plurality of arrays of rescaling coefficients,
computing an array of statistical parameters (for instance, K0) of the buffered transformed signal samples,
selecting (for instance, 224) an array of rescaling coefficients (for instance, K) in the plurality of arrays of rescaling coefficients having a least distance from the array of statistical parameters, and
rescaling (for instance, 242) the transformed signal samples using the array of statistical parameters as rescaling factor, obtaining a dataset of rescaled signal samples (for instance, N) as a result, applying auto-encoder artificial neural network, ANN, processing (for instance, 26, 260) to the dataset of rescaled signal samples, producing a dataset of reconstructed signal samples (for instance, Rf), computing (for instance, 28) an error of reconstruction (for instance, ε) between the dataset of reconstructed signal samples and the dataset of rescaled signal samples, and providing (for instance, 28) a trigger signal (for instance, T) to a user circuit (for instance, U), the trigger signal indicative of the calculated error of reconstruction (for instance, ε) reaching or failing to reach a certain threshold value (for instance, a threshold τ indicative of a boundary between normal and anomalous evolution of the dynamical system).

As exemplified herein, the computing statistical parameters of the data buffer comprises:
item-wise computing (for instance, 220) statistical parameters of the data buffer and entry-wise adding the computed statistical parameters of the data buffer,
producing (220) the drift signal (Δ) as a product among derivatives of the computed entry-wise summations (M, Ψ) of the computed statistical parameters of the data buffer (A), and
selecting (e.g., triggering keeping or discarding of) transformed signal samples buffered in the data buffer as a function of the computed drift signal reaching or failing to reach at least one threshold (for instance, an amplitude threshold J0, J1, J2 and/or a length threshold t1, t2, t3, t4, t5, t6).

As exemplified herein, the method comprises:
computing metrics distances (for instance, 222, 224) between the array of statistical parameters and each array of resealing coefficients in the plurality of arrays of resealing coefficients, and
selecting (for instance, 224) an array of scaling coefficients (for instance, K) having the least computed distance from the computed array of statistical parameters among the computed distances,
wherein the metrics used to compute distances comprise Euclidian and/or cosine similarity metric.

As exemplified herein, the auto-encoder artificial neural network, ANN, processing (for instance, 26, 260) comprises processing layers comprising at least:
an encoder layer (for instance, 260A) configured to receive the dataset of resealed signal samples (for instance, N) and to apply a first set of weights (for instance, $W_A$) and a first activation function (for instance, $\beta_A$) thereto, producing a latent representation signal as a result, and
a decoder layer (for instance, 260B) configured to receive the latent representation signal produced from the first encoder layer (260A) and apply a second set of weights (for instance, $W_B$) and a second activation function (for instance, $\beta_B$) thereto, producing the dataset of reconstructed signal samples as a result,
wherein:
at least one of the first and second set of weights comprises random samples drawn from a probability distribution function (for instance, 242).

As exemplified herein, the method comprises:
producing (for instance, 242) a probability distribution function,
drawing random samples from the probability distribution function, and
initializing at least one of the first and second set of weights of the auto-encoder ANN processing with the random samples drawn from the probability distribution function.

As exemplified herein, the second set of weights comprises a transposed version of the first set of weights.

As exemplified herein, producing the probability distribution function comprises:
selecting a type of probability distribution function having at least one selectable parameter, and
setting the at least one selectable parameter of the selected type of probability distribution function,
wherein the probability distribution function is selectable out of a group of probability distribution functions consisting of Gaussian distribution, uniform distribution and standard normal distribution.

As exemplified herein, at least one of the first and second activation functions comprises an activation function selected out of a linear activation function and a hyperbolic tangent activation function.

As exemplified herein, the method comprises:

performing multiple instances of the auto-encoder ANN processing (for instance, 26, 260, 260', 260") re-initializing (for instance, 262, W1, W2, W3) at least one of a first (for instance, $W_A$) and second (for instance, $W_B$) set of weights of the auto-encoder ANN processing (for instance, 26, 260) with random samples drawn from a produced probability distribution function (for instance, 242), obtaining a plurality of datasets of reconstructed signal samples (for instance, Rf) as a result of the performing multiple instances of auto-encoder ANN processing (for instance, 26, 260, 260', 260"), calculating (for instance, 28) a plurality of errors of reconstruction (for instance, $\varepsilon$, $\varepsilon'$, $\varepsilon''$) between the plurality of datasets of reconstructed signal samples and the dataset of resealed signal samples, providing (for instance, 28) to a user circuit (for instance, U) a signal (for instance, T) indicative of a fraction of the calculated plurality of errors of reconstruction (for instance, $\varepsilon$) reaching or failing to reach a certain threshold value (for instance, $\tau$) indicative of a boundary between a normal and anomalous evolution of the dynamical system.

As exemplified herein, the normalization processing (24) comprises:

a first normalization stage (for instance, 240) comprising soft-max rescaling, preferably low-temperature rescaling, and a second normalization stage (for instance, 242) comprising mapminmax rescaling, wherein the array of statistical parameters of the buffered transformed signal samples is produced as a result of performing the mapminmax resealing.

As exemplified herein, the array of statistical parameters of the buffered transformed signal samples is produced as a result of computing (for instance, 220) the statistical parameters (for instance, M, $\Psi$) of the data buffer (for instance, A).

A processing system (for instance, 14, 16) as exemplified herein, is configured to be coupled to a sensor (for instance, 12) to receive therefrom at least one sensing signal sensed at a (e.g., physical) dynamical system evolving over time, wherein the at least one sensing signal comprises a time-series of signal samples (for instance, S), the processing system (14, 16) configured to implement the computer-implemented method (for instance, 20) as exemplified herein and to produce (for instance, 28) at least one trigger signal (for instance, T) as a function of the at least one calculated error of reconstruction (for instance, $\varepsilon$).

A device (for instance, 10) as exemplified herein, comprises:

a sensor (for instance, 12) configured to be coupled to a dynamical system evolving over time and to provide at least one sensing signal comprises a time-series of signal samples (S), and a processing system (for instance, 14) as exemplified herein coupled to the sensor (for instance, 12) to receive therefrom the at least one sensing signal.

As exemplified herein, the sensor (for instance, 12) comprises an inertial sensor, preferably a tri-axial accelerometer sensor.

A computer program product as exemplified herein is loadable in at least one processing circuit (for instance, 14, 16) and comprises software code portion implementing the method as exemplified herein when run on the processing circuit.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A computer-implemented method, comprising:

receiving, from a dynamical system evolving over time, at least one sensing signal from an inertial sensor, the at least one sensing signal comprising a time-series of signal samples;

applying domain transformation processing to the time-series of signal samples to produce a dataset of transformed signal samples therefrom;

applying drift detection processing, to the dataset of transformed signal samples, the drift detection processing comprising:

buffering the transformed signal samples, obtaining a data buffer having transformed signal samples as entries;

computing statistical parameters of the data buffer;

producing a drift signal indicative of an evolution over time of the dynamical system as a function of the computed statistical parameters; and selecting the transformed signal samples buffered in the data buffer as a function of the drift signal;

applying normalization processing to the buffered transformed signal samples, the normalization processing comprising:

providing a plurality of arrays of rescaling coefficients;

computing an array of statistical parameters of the buffered transformed signal samples;

selecting an array of rescaling coefficients in the plurality of arrays of rescaling coefficients having a least distance from the array of statistical parameters; and rescaling the transformed signal samples using the array of statistical parameters as rescaling factor, obtaining a dataset of rescaled signal samples as a result;

applying auto-encoder artificial neural network (ANN) processing to the dataset of rescaled signal samples, producing a dataset of reconstructed signal samples as a result;

calculating an error of reconstruction between the dataset of reconstructed signal samples and the dataset of rescaled signal samples; and producing a trigger signal to a user circuit, the trigger signal being indicative of the calculated error of reconstruction reaching or failing to reach a threshold.

2. The computer-implemented method of claim 1, wherein the computing statistical parameters of the data buffer comprises:

item-wise computing statistical parameters of the data buffer and entry-wise summing the computed statistical parameters of the data buffer;

producing the drift signal as a product among derivatives of the entry-wise summed computed statistical parameters of the data buffer; and selecting the transformed signal samples buffered in the data buffer as a function of the produced drift signal reaching or failing to reach at least one threshold.

3. The computer-implemented method of claim 1, further comprising:
  computing metrics distances between the array of statistical parameters and each array of rescaling coefficients in the plurality of arrays of rescaling coefficients; and
  selecting the array of rescaling coefficients having a least computed distance from the computed array of statistical parameters among the computed distances;
  wherein metrics used to compute the distances comprise Euclidian and/or cosine similarity metric.

4. The computer-implemented method of claim 1, wherein the auto-encoder ANN processing comprises processing layers comprising at least:
  an encoder layer configured to receive the dataset of rescaled signal samples and to apply a first set of weights and a first activation function thereto, producing a latent representation signal as a result; and
  a decoder layer configured to receive the latent representation signal produced from the encoder layer and apply a second set of weights and a second activation function thereto, producing the dataset of reconstructed signal samples as a result;
  wherein at least one of the first and second sets of weights comprises random samples drawn from a probability distribution function.

5. The computer-implemented method of claim 4, further comprising:
  producing the probability distribution function;
  drawing the random samples from the probability distribution function; and
  initializing at least one of the first or second set of weights of the auto-encoder ANN processing with the random samples drawn from the probability distribution function.

6. The computer-implemented method of claim 4, wherein the second set of weights comprises a transposed version of the first set of weights.

7. The computer-implemented method of claim 4, wherein producing the probability distribution function comprises:
  selecting a type of probability distribution function having at least one selectable parameter; and
  setting the at least one selectable parameter of the selected type of probability distribution function;
  wherein the probability distribution function is selectable out of a group of probability distribution functions consisting of Gaussian distribution, uniform distribution and standard normal distribution.

8. The computer-implemented method of claim 4, wherein at least one of the first and second activation functions comprises an activation function selected out of a linear activation function and a hyperbolic tangent activation function.

9. The computer-implemented method of claim 1, further comprising:
  performing multiple instances of the auto-encoder ANN processing, re-initializing at least one of a first and second sets of weights of the auto-encoder ANN processing with random samples drawn from a produced probability distribution function, obtaining a plurality of datasets of reconstructed signal samples as a result of the performing multiple instances of the auto-encoder ANN processing;
  calculating a plurality of errors of reconstruction between the plurality of datasets of reconstructed signal samples and the dataset of rescaled signal samples; and
  providing to the user circuit a signal indicative of a fraction of the calculated plurality of errors of reconstruction reaching or failing to reach a certain threshold value indicative of a boundary between a normal and anomalous evolution of the dynamical system.

10. The computer-implemented method of claim 1, wherein the normalization processing comprises:
  a first normalization stage comprising soft-max rescaling, preferably low-temperature rescaling; and
  a second normalization stage comprising mapminmax rescaling;
  wherein the array of statistical parameters of the buffered transformed signal samples is produced as a result of performing the mapminmax rescaling.

11. The computer-implemented method of claim 1, wherein the array of statistical parameters of the buffered transformed signal samples is produced as a result of computing statistical parameters of the data buffer.

12. A device comprising:
  a processing circuit; and
  a non-transitory memory circuit coupled to the processing circuit, and storing instructions that, when executed by the processing circuit, implement a method comprising:
    receiving, from a dynamical system evolving over time, at least one sensing signal from an inertial sensor, the at least one sensing signal comprising a time-series of signal samples;
    applying domain transformation processing to the time-series of signal samples to produce a dataset of transformed signal samples therefrom;
    applying drift detection processing, to the dataset of transformed signal samples, the drift detection processing comprising:
      buffering the transformed signal samples, obtaining a data buffer having transformed signal samples as entries;
      computing statistical parameters of the data buffer;
      producing a drift signal indicative of an evolution over time of the dynamical system as a function of the computed statistical parameters; and
      selecting the transformed signal samples buffered in the data buffer as a function of the drift signal;
    applying normalization processing to the buffered transformed signal samples, the normalization processing comprising:
      providing a plurality of arrays of rescaling coefficients;
      computing an array of statistical parameters of the buffered transformed signal samples;
      selecting an array of rescaling coefficients in the plurality of arrays of rescaling coefficients having a least distance from the array of statistical parameters; and
      rescaling the transformed signal samples using the array of statistical parameters as rescaling factor, obtaining a dataset of rescaled signal samples as a result;
    applying auto-encoder artificial neural network (ANN) processing to the dataset of rescaled signal samples, producing a dataset of reconstructed signal samples as a result;
    calculating an error of reconstruction between the dataset of reconstructed signal samples and the dataset of rescaled signal samples; and producing a trigger signal to a user circuit, the trigger signal being indicative of the calculated error of reconstruction reaching or failing to reach a threshold.

13. The device of claim 12, further comprising:
the sensor configured to be coupled to the dynamical system evolving over time and to generate the at least one sensing signal comprising the time-series of signal samples.

14. The device of claim 13, wherein the inertial sensor comprises a tri-axial accelerometer sensor.

15. The device of claim 12, wherein the computing statistical parameters of the data buffer comprises:
item-wise computing statistical parameters of the data buffer and entry-wise summing the computed statistical parameters of the data buffer;
producing the drift signal as a product among derivatives of the entry-wise summed computed statistical parameters of the data buffer; and
selecting the transformed signal samples buffered in the data buffer as a function of the produced drift signal reaching or failing to reach at least one threshold.

16. The device of claim 12, wherein the method further comprises:
computing metrics distances between the array of statistical parameters and each array of rescaling coefficients in the plurality of arrays of rescaling coefficients; and
selecting the array of rescaling coefficients having a least computed distance from the computed array of statistical parameters among the computed distances;
wherein metrics used to compute the distances comprise Euclidian and/or cosine similarity metric.

17. The device of claim 12, wherein the auto-encoder ANN processing comprises processing layers comprising at least:
an encoder layer configured to receive the dataset of rescaled signal samples and to apply a first set of weights and a first activation function thereto, producing a latent representation signal as a result; and
a decoder layer configured to receive the latent representation signal produced from the encoder layer and apply a second set of weights and a second activation function thereto, producing the dataset of reconstructed signal samples as a result;
wherein at least one of the first and second sets of weights comprises random samples drawn from a probability distribution function.

18. A computer program product, loadable in at least one processing circuit, and comprising a software code portion that, when run on the at least one processing circuit, implements a method comprising:
receiving, from a dynamical system evolving over time, at least one sensing signal from an inertial sensor, the at least one sensing signal comprising a time-series of signal samples;
applying domain transformation processing to the time-series of signal samples to produce a dataset of transformed signal samples therefrom;
applying drift detection processing, to the dataset of transformed signal samples, the drift detection processing comprising:
buffering the transformed signal samples, obtaining a data buffer having transformed signal samples as entries;
computing statistical parameters of the data buffer;
producing a drift signal indicative of an evolution over time of the dynamical system as a function of the computed statistical parameters; and
selecting the transformed signal samples buffered in the data buffer as a function of the drift signal;
applying normalization processing to the buffered transformed signal samples, the normalization processing comprising:
providing a plurality of arrays of rescaling coefficients;
computing an array of statistical parameters of the buffered transformed signal samples;
selecting an array of rescaling coefficients in the plurality of arrays of rescaling coefficients having a least distance from the array of statistical parameters; and
rescaling the transformed signal samples using the array of statistical parameters as rescaling factor, obtaining a dataset of rescaled signal samples as a result;
applying auto-encoder artificial neural network (ANN) processing to the dataset of rescaled signal samples, producing a dataset of reconstructed signal samples as a result;
calculating an error of reconstruction between the dataset of reconstructed signal samples and the dataset of rescaled signal samples; and
producing a trigger signal to a user circuit, the trigger signal being indicative of the calculated error of reconstruction reaching or failing to reach a threshold.

19. The computer program product of claim 18, wherein the computing statistical parameters of the data buffer comprises:
item-wise computing statistical parameters of the data buffer and entry-wise summing the computed statistical parameters of the data buffer;
producing the drift signal as a product among derivatives of the entry-wise summed computed statistical parameters of the data buffer; and
selecting the transformed signal samples buffered in the data buffer as a function of the produced drift signal reaching or failing to reach at least one threshold.

20. The computer program product of claim 18, wherein the method further comprises:
computing metrics distances between the array of statistical parameters and each array of rescaling coefficients in the plurality of arrays of rescaling coefficients; and
selecting the array of rescaling coefficients having a least computed distance from the computed array of statistical parameters among the computed distances;
wherein metrics used to compute the distances comprise Euclidian and/or cosine similarity metric.

21. The computer program product of claim 18, wherein the auto-encoder ANN processing comprises processing layers comprising at least:
an encoder layer configured to receive the dataset of rescaled signal samples and to apply a first set of weights and a first activation function thereto, producing a latent representation signal as a result; and
a decoder layer configured to receive the latent representation signal produced from the encoder layer and apply a second set of weights and a second activation function thereto, producing the dataset of reconstructed signal samples as a result;
wherein at least one of the first and second sets of weights comprises random samples drawn from a probability distribution function.

* * * * *